United States Patent [19]

Abraham

[11] Patent Number: 4,590,516

[45] Date of Patent: May 20, 1986

[54] RECORDED PROGRAM COMMUNICATION SYSTEM

[75] Inventor: Nicholas F. Abraham, Cape Coral, Fla.

[73] Assignee: World Video Library, Inc., Fort Worth, Tex.

[21] Appl. No.: 383,604

[22] Filed: Jun. 1, 1982

[51] Int. Cl.⁴ .............................................. H04L 7/18
[52] U.S. Cl. ........................................ 358/86; 455/5; 358/85
[58] Field of Search ...................... 358/85, 86, 84, 142, 358/114, 141; 455/5

[56] References Cited

U.S. PATENT DOCUMENTS

| | | | |
|---|---|---|---|
| 3,729,581 | 4/1973 | Anderson | 358/85 |
| 3,746,780 | 7/1973 | Stetten et al. | 179/214 |
| 3,790,700 | 2/1974 | Callais et al. | 455/5 |
| 3,886,302 | 5/1975 | Kosco | 358/86 |
| 4,008,369 | 2/1977 | Theurer | 358/86 |
| 4,028,733 | 6/1977 | Ulicki | 358/86 |
| 4,163,254 | 7/1979 | Block et al. | 358/122 |
| 4,381,522 | 4/1983 | Lambert | 455/5 |

*Primary Examiner*—Edward L. Coles, Sr.
*Attorney, Agent, or Firm*—Jacob Shuster

[57] ABSTRACT

Telephone selection signals are conducted through a separate signal path to a program selector at a remote program storing station from which program readout signals are conducted, after the telephone link is broken, to a signal carrier transmitter. A message signal is inserted during a timed message period, after which program transmission begins and is registered by a billing computer.

19 Claims, 3 Drawing Figures

RECORDED PROGRAM COMMUNICATION SYSTEM

BACKGROUND OF THE INVENTION

This invention relates to combined telephone and modulated carrier signal communication systems.

Communication systems for distributing audio and video programs on a subscription basis are becoming more widespread. Cable transmission of such program material is particularly popular for local broadcast while long range broadcast systems utilize satellite relay facilities. Generally, a subscriber is limited as to the selection of desired program material by a broadcast schedule.

The use of a telephone communication link to access stored audio and video information that is transmitted independently of the telephone link is also well known as disclosed, for example, in U.S. Pat. No. 3,746,780 to Stetten et al. Such systems require receiver modification and costly equipment at the subscriber station creating maintenance problems for the subscriber as well as costly installation.

It is therefore an important object of the present invention to provide a communication system for distribution of pre-recorded or storage entertainment and informational program material by carrier signal transmission to subscribers utilizing conventional receivers such as, but not necessarily limited to standard television sets.

An additional object is to provide telephone access to and selection of available stored program material in an economically feasible manner.

SUMMARY OF THE INVENTION

In accordance with the present invention, a signal traffic controller alternately establishes separate signal paths for incoming telephone signals and outgoing audio and video signals originating from a program library remote from subscriber stations. Through the signal traffic controller, a message signal is inserted to provide program content or identifying data, as well as to provide an opportunity for sponsors to present commercials and advertisements to the subscribers. Further, operation of a billing computer is delayed for the duration of the message period so as to enable the subscriber by redialing the remote program station to cancel forthcoming program transmission and not be billed therefor.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF PREFERRED EMBODIMENT

Figure 1:
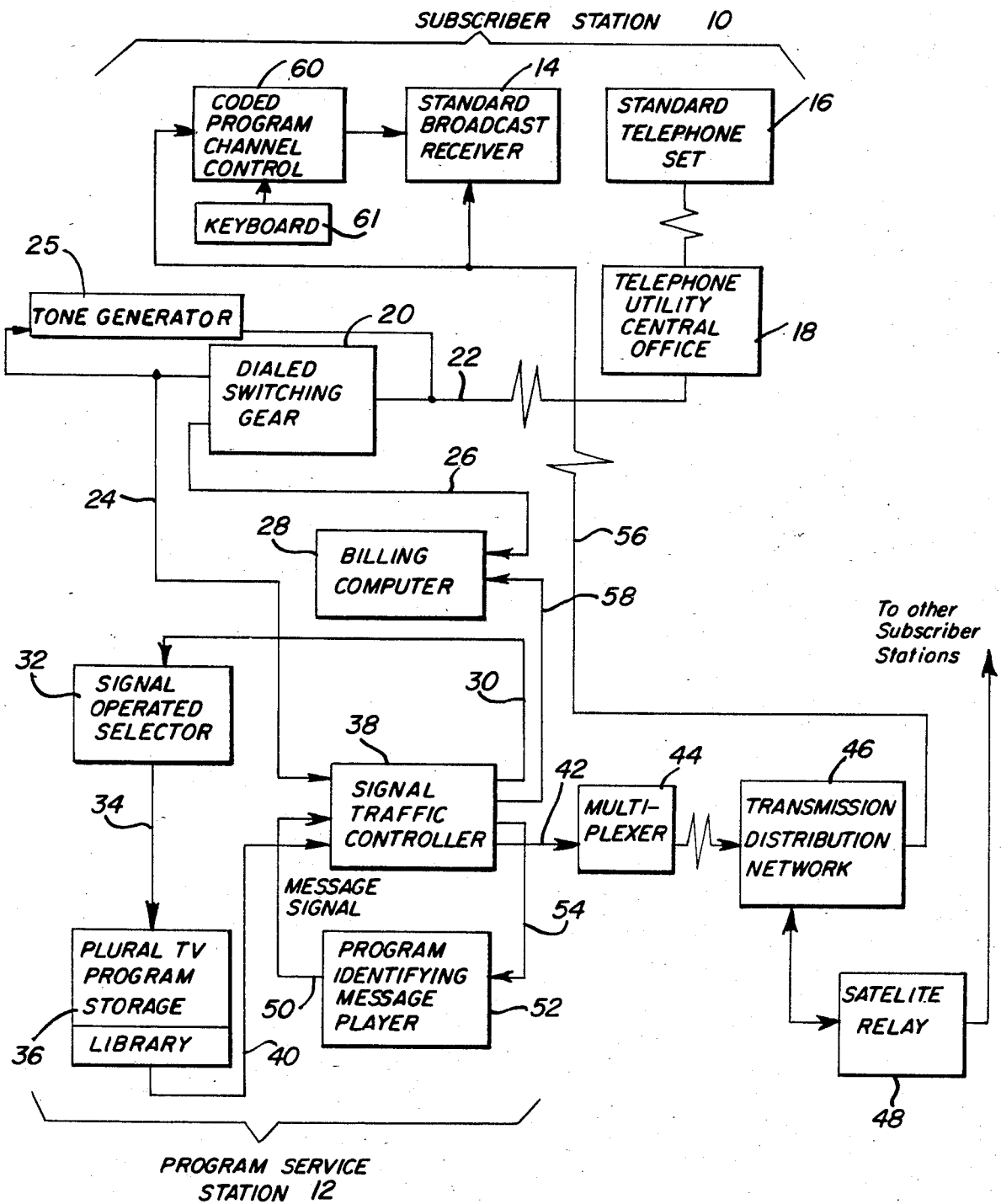
FIG. 1 is a block diagram schematically illustrating the communication system of the present invention.

Referring now to the drawings in detail, FIG. 1 diagrammatically depicts one of many subscriber stations 10 serviced from a common remote head end or program station 12 by the system of the present invention. Located at the subscriber station, which may be a residential home, is a radiant energy receiver 14, such as a conventional television set, and a conventional telephone instrument 16. The receiver 14 is not internally altered and may therefore function to receive and display audio-video programs broadcast by existing broadcast networks including radio frequency and cable transmission systems. The telephone instrument 16 is also operative as part of an existing telephone communication network, in a conventional manner, to receive and transmit voice communications through dialed connections established at a central office 18 of the telephone utility. Such a dialed communication link is established between each subscriber station and the program service station 12 by means of a conventional dialed switching gear 20.

Thus, an incoming dialed telephone signal in line 22 activates the switching gear 20 at the station 12 to transfer such signal to line 24 at a predetermined voltage level, such as 8 volts, and load the line 22 to produce a beep tone through a tone generator 25 that is returned to the subscriber telephone set 16 signifying completion of a program selecting operation. The telephone hand set is then replaced on the instrument base to produce a hang-up signal in the switching gear fed by line 26 to a billing computer 28 to enable operation thereof.

In accordance with the present invention, the telephone signal in line 22, which is of the pulse train type, includes a selection code that is fed by lines 24 and 30 to a signal operated selector 32 of any suitable type well known in the art from which a converted selection command signal is fed by line 34 to a program storage library 36 initiating readout operation thereof and loading the telephone lines through the dialed switching gear 20. The load connection established by lines 24, 30 and 34 extends through a signal traffic controller 38 by means of which a signal path is established between an output signal line 40 from the program storage library 36 and a transmitter signal modulating line 42, connected by a multiplexer 44 to the carrier signal transmitting equipment associated with an existing broadcast distribution network 46, such as radio frequency cable transmission systems for broadcast of radio and television programs. Such transmission network may include a satellite relay 48 for extending the broadcast range to cover very remote subscriber stations.

The signal path established through the controller 38 during readout operation has a message signal applied thereto through line 50 from a message player 52 in response to a trigger signal in line 54 from controller 38. The message signal contains program content identifying data that is fed through line 42 to the network 46 in advance of program transmission from the library 36. Such message data is therefore received at the subscriber station through the communication link 56 so that the subscriber may verify the program selection made. If there was an error, the subscriber may redial correctly during the message period to either stop or restart the readout operation. Operation of the billing computer 28 is initiated only upon completion of the message period in response to a signal in line 58.

The signal output from library 36 in line 40 in addition to containing the selected program data in the form of combined audio and video carrier modulating signals, includes coded data preceding the program data to which the message player 52 and a program channel control 60 responds at the subscriber station. Also, a coded transmission terminating signal is recorded for shutdown of reception at the subscriber station at the end of program transmission. The control, 60 has a keyboard 61 associated therewith for inputting a selection code corresponding to a desired program selection, matching the dialed selection code. Reception of a selection code by the receiver 14 corresponding to the setting of control 60 will accordingly effect fine tuning of the receiver 14 from an initial channel setting to enable reception of the selected program signal following the preceding message period. At the end of the readout operation of library 36, the coded transmission terminating signal is outputted to turn off the control 60 thereby restoring the receiver 14 to normal operation.

Figure 2:
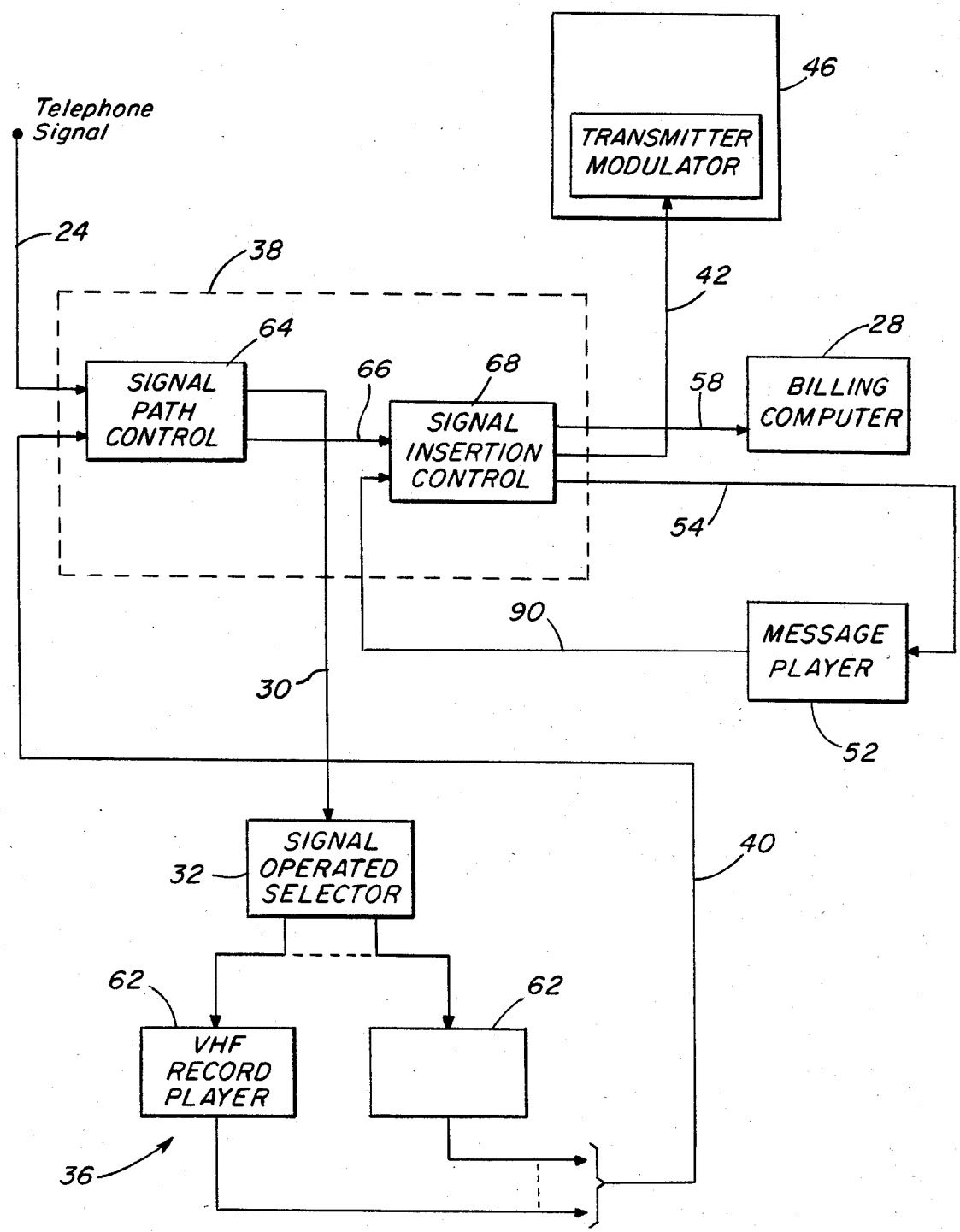
FIG. 2 is a simplified circuit diagram corresponding to portions of the system depicted in FIG. 1.

FIG. 2 illustrates by way of example one embodiment of a program storage library 36 wherein a plurality of VHF record players 62 are provided in which code and program data is recorded for readout as hereinbefore described. One of such record players is selected for operation by a selection signal. The readouts of such recorders are fed through line 40 to a signal path establishing control section 64 of the controller 38 by means of which separate signal paths are alternatively established in proper timed sequence for the readout signals in line 40 and the telephone pulse signals in line 24. The readout signal path is thereby established through line 66 to a message insertion control section 68 from which lines 42, 54 and 58 extend as hereinbefore described with respect to FIG. 1.

Figure 3:
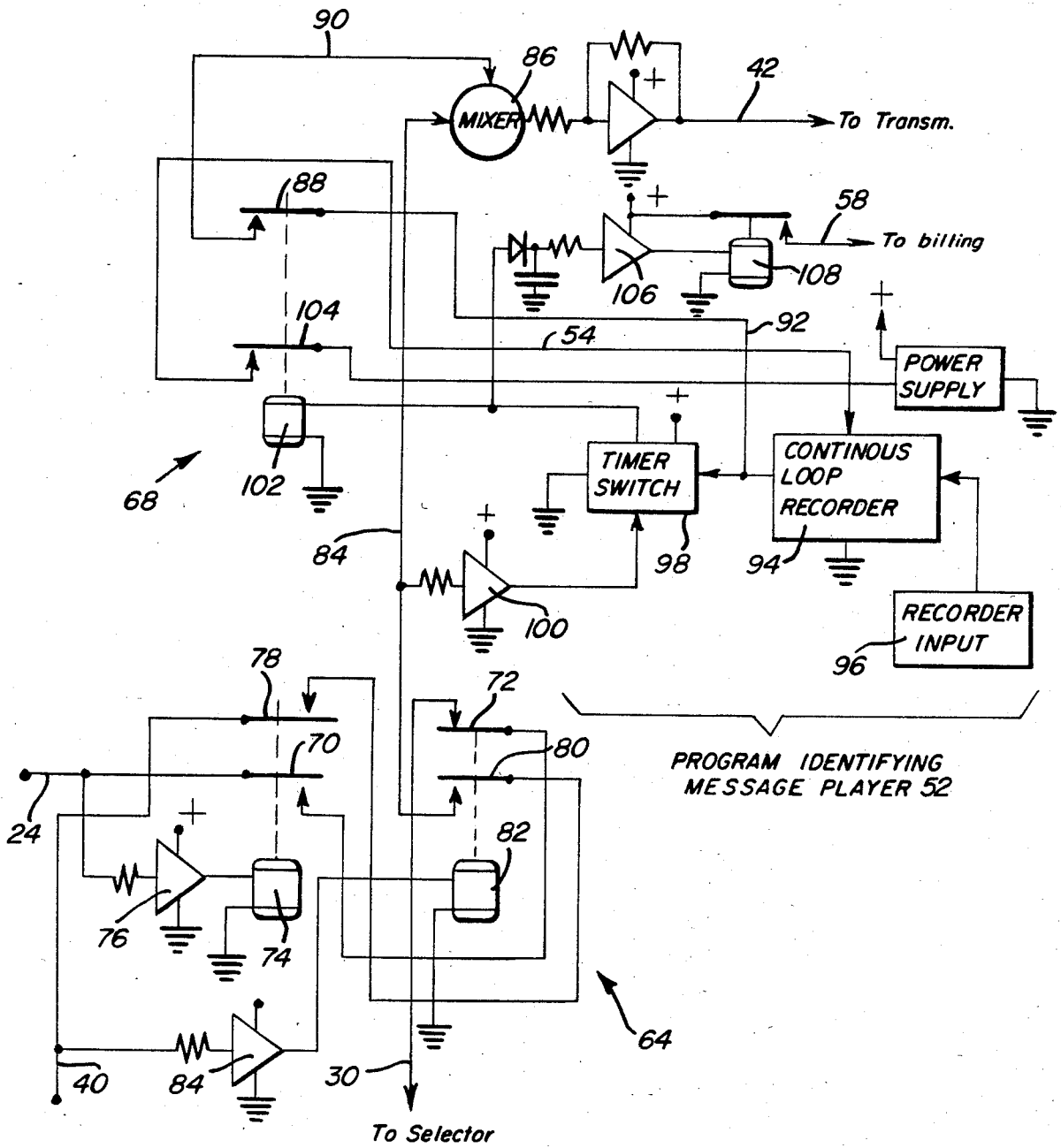
FIG. 3 is an electrical circuit diagram illustrating in greater details one embodiment of the circuit arrangement depicted in FIG. 2.

By way of example, FIG. 3 shows a circuit corresponding to controller 38 with respect to a single subscriber station, including the signal path control section 64. The telephone signal input in line 24 is connected to a normally open relay switch 70 from which a signal path is established through normally closed relay switch 72 and line 30 for transfer of the telephone signal to the selector 32. Such signal path is established by closing of relay switch 70 upon energization of relay coil 74 by the 8 volt signal level in line 24 connected by voltage amplifier 76 to the relay coil. Energization of relay coil 74 also opens normally closed relay switch 78 to thereby open a separate signal path for the readout signals in line 40 connected to relay switch 78. The relay switch 78 is connected in series with a normally open relay switch 80 to complete a signal path for the readout signals in response to energization of relay coil 82. An amplifier 84 connected to readout signal line 40 provides energizing voltage for relay coil 82 from the readout signal voltage level in line 40 to complete a signal path therefrom to line 84. Thus, the separate signal paths for the telephone and transmitter modulating signals in lines 24 and 40 are alternately established in a non-interferring manner as aforementioned.

The modulating signal from readout signal line 40 is applied through line 84 to one input of a mixer 86 to which a message signal is applied from message player 52 through a normally open relay switch 88 of the message insertion control section 68 aforementioned in connection with respect to FIG. 2. The message signal is conducted to the mixer by lines 90 and 92 connected to the output of a continuous loop-type recorder 94 of the message player 52 during playback operation. Appropriate pre-recorded messages are recorded on recording medium through an input 96. Thus, during the message period preceding transmission of the selected program material from library 36, relevant audio or audio-video messages selected by the initial coded readout signal from the library 36, may be furnished to the subscriber, together with other informational material including commercials. The duration of the message period is determined by a timer 98 triggered into operation by a signal from amplifier 100 connected to the program signal line 84. During the ensuing timer cycle, relay coil 102 is energized to close message relay switch 88 and a second relay switch 104 through which operation of the recorder 94 is enabled.

At the end of the message period, the output of the timer 98 causes deenergization of relay coil 102 to interrupt the message signal path through relay switch 88 and disable the time and duration of the program transmission after the message period for subscriber billing purposes.

If a telephone reset signal is received at the program service station during the message period, relay coil 74 is energized to open relay switch 74 thereby interrupting the signal path for the readout signal in lines 40 and 84. The timer 98 is thereby reset and relay coil 102 deenergized to prevent further transmission to line 42 as well as to prevent triggering of the billing operation through relay 108. The reset code in the telephone signal then fed to the selector 32 by line 30 will effect reset of the library 36 for reception of a new selection command.

It should be appreciated that the foregoing circuit arrangement of FIG. 3 will be functionally embodied in solid state computer hardware utilizing well known logic and data processing techniques for handling the transmission of data to and from many subscriber stations.

In summary, a subscriber at station 10 initiates program selection by inputting a code through keyboard 61. The input code representing one television program, for example, recorded in library 36 is obtained from a published program directory furnished each subscriber. The receiver 14 is then turned on and manually tuned to a preset channel in accordance with instruction given in the program directory. The subscriber then dials a number on the telephone instrument 16, including, for example, the usual three digit exchange code and a four digit station and program selection code. A telephone communication link is thereby established with the station 12 through the switching gear 20 and when the program selection operation is completed at station 12, a return beep signal is heard by the subscriber through the telephone instrument. Hang-up of the telephone then initiates the program readout operation and conditions the billing computer 28 for subsequent operation. During an initial phase of the readout operation, the recorded message player 52 inserts its signal to produce program content identification data as well as to furnish other information in advance of the selected program transmission. The selected program transmission begins at the end of the timed message period at which time the billing operation also begins. By redialing a reset code during the message period, the subscriber has the opportunity to cancel program transmission and the associated billing operation. Only when the message cyle is completed does the program transmission and billing operation occur. At the end of the program transmission, a signal recorded in the selected VHF player disables the channel control 60 so that normal or conventional operation of the receiver 14 may be effected through regular channels.

It should be appreciated that the system hereinbefore described may be utilized for audio programs employing different types of signal carrier transmission. In all cases, a conventional carrier signal receiver 14 and a conventional telephone instrument 16 is utilized at the subscriber station 10 without internal alteration. Except for control 60, specialized equipment is located only at the remote program service station 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a communication system having a plurality of subscriber stations each of which has a carrier signal broadcast receiver and a conventional telephone instrument associated with a telephone communication network, and a remote subscriber service station coupled to said telephone network by a switching mechanism through which signal readout of a program storing library is controlled in response to telephone dialed selection signals from the subscriber station for transmission of selected program signals through a signal carrier distribution network to the receivers at the subscriber stations, the improvement comprising signal traffic controller means operatively connecting the switching mechanism and the distribution network to the program storing library for automatically establishing separate signal paths for the telephone dialed signals and the selected program signals, signal content identifying means for generating an identifying signal of predetermined duration, means for inserting the identifying signal through the same established signal path corresponding to the selected program signals prior to transmission thereof, and means for registering transmission of the selected program signals in response to completion of the identifying signal.

2. The system of claim 1 wherein each of said broadcast receivers is a conventional television set.

3. The system of claim 2 wherein said signal carrier distribution network is of the cable transmission type.

4. The system of claim 3 wherein said signal carrier distribution network includes a satellite relay system.

5. The system of claim 4 wherein said program storing library includes a plurality of VHF record players.

6. The system of claim 5 wherein said selected program signals include code and combined audio and video carrier modulating data.

7. The system of claim 6 including code responsive means connected to each of said broadcast receivers for conditioning the receivers to receive the selected program signals.

8. The system of claim 7 wherein the transmission registering means includes a billing computer.

9. The system of claim 1 wherein said program storing library includes a plurality of VHF record players.

10. The system of claim 1 wherein said selected program signals include code and combined audio and video carrier modulating data.

11. The system of claim 10 including code responsive means connected to each of said broadcast receivers for conditioning the receivers to receive the selected program signals.

12. The system of claim 1 wherein the transmission registering means includes a billing computer.

13. The system of claim 1 wherein the program storing library, the signal traffic controller means, the signal content identifying means, and the signal switching means are located at the remote subscriber service station.

14. In a communication system having a plurality of carrier signal receivers to which selected program information is transmitted by carrier modulating signals from a remote record storing library in response to coded pulse signals, the improvement comprising signal traffic controller means for alternately establishing signal paths along which the coded pulse signals to the record storing library and the carrier modulating signals therefrom are respectively fed, signal content identifying means for generating an identifying signal of predetermined duration, means for automatically applying the identifying signal to one of the established signal paths during intervals between the carrier modulating signals, and means for registering the selected program information transmitted only in response to prior completion of the identifying signal corresponding thereto.

15. The system of claim 14 wherein the transmission registering means includes a billing computer.

16. The system as defined in claim 15 including signal operated means responsive to reset signals transmitted through the other of the established signal paths prior to completion of the identifying signal for preventing the registration of the selected program information.

17. A method of registering reception of selected program information at subscriber stations of a subscription television system having a head end library at which a plurality of signal sources modulate a carrier signal to transmit the selected program information to the subscriber stations in response to selection command signals carried by a conventional telephone network linking the head end library to the subscriber stations, including the steps of: establishing separate signal paths for carrier modulating signals and the selection command signals, respectively, between each of the subscriber stations and the library; transmitting the selection command signals and the carrier modulating signals along the respective signal paths thereof in time spaced relation to each other; applying a program identifying signal to the carrier modulating signal path during intervals between the selection command and carrier modulating signals preceding the selected program information; registering the carrier modulating signals transmitted along the signal path thereof upon elapse of the intervals immediately preceding each of the carrier modulating signals; and preventing said registration of the carrier modulating signals in response to reset signals transmitted along said command signal path during the preceding intervals.

18. A subscriber type television system having a central television program library and processing facility, a plurality of subscriber terminals, a cable distribution subsystem linking the facility with the subscriber terminals, and means for enabling selection of video programs available at the facility servient to the plurality of said terminals, including means for conversion of signals communicated in upstream and downstream signal paths between the subscriber terminals and the facility, the improvement comprising program control means at the facility having first means for enabling any of said terminals during a predetermined period of time, prior to said communication by the converted signals in one of the signal paths, second means for transmitting the selected program on a pay basis after termination of said predetermined period of time, and third means responsive to a reset signal in the other of the paths during said predetermined period for inhibiting transmission of the selected program.

19. Apparatus for remotely viewing selected television program material at remote receiving locations comprising, television transmitting means at a central location for providing a plurality of television signals on a plurality of channels, means at said central location for transmitting said television signals over a common transmission path to said remote receiving locations, a plurality of sources of selectable television program video signals, computer means coupled to said sources said television transmitting means responsive to a selecting signal from a remote receiving location designating a selected television program for providing selecting control signals enabling a corresponding one of said program sources to provide the corresponding television video signal and for providing switching control signals for coupling the latter video signal for broadcast by said television transmitting means on a designated one of said channels, video switching means responsive to said switching control signals for coupling the television program video signals from the enabled sources to said television transmitting means for broadcast on designated ones of said channels, said computer means also providing a data signal to said television transmitting means on the designated one of said channels, representative of the selected television program to be transmitted, during a timed interval preceding the transmission of the selected television program, telephone means for transmitting said selecting signal from a remote receiving location to the computer means to designate the selected television program and viewer operated means at the receiving location connected to the telephone means for generating the selected signal transmitted to the computer means before said timed interval.

* * * * *